United States Patent [19]
Vanheerentals

[11] 3,864,036
[45] Feb. 4, 1975

[54] APPARATUS FOR CONTROLLING EXPOSURE
[75] Inventor: Jacques Vanheerentals, Schoten, Belgium
[73] Assignee: Agfa-Gevaert Aktiengesellschaft, Leverkusen, Germany
[22] Filed: Mar. 13, 1974
[21] Appl. No.: 450,619

[30] Foreign Application Priority Data
Mar. 17, 1973 Germany............................ 2313349

[52] U.S. Cl.................... 355/68, 250/209, 250/236, 250/559, 250/578, 355/71, 356/178, 356/206
[51] Int. Cl. .......................................... G03b 27/76
[58] Field of Search .......... 355/38, 68, 71; 250/559, 250/209, 578, 236; 356/175, 178, 356/203, 204, 206

[56] References Cited
UNITED STATES PATENTS
| | | | |
|---|---|---|---|
| 2,161,371 | 6/1939 | Mees..................................... | 355/71 |
| 2,557,182 | 6/1951 | Forgett ................................ | 355/68 |
| 3,575,702 | 4/1971 | Huber.................................. | 355/68 X |
| 3,790,789 | 2/1974 | Takahashi et al.................. | 355/68 X |

Primary Examiner—Richard A. Wintercorn
Attorney, Agent, or Firm—Michael S. Striker

[57] ABSTRACT

Apparatus for controlling exposure of variable contrast photosensitive material which is exposed to light passing through an original in two extreme colors and whose gradation is different for each extreme color comprising an electronic timer having adjusting devices for selecting the total exposure time to light in the two colors as determined on the basis of the contrast grade of the photosensitive material; an operating arrangement for selecting the ratio of exposures to light in the two colors within the total exposure time; first exposure selecting devices having calibrating values determined by the desired contrast of the exposed photosensitive material; second exposure selecting devices having calibrating values determined on the basis of the minimum and maximum densities of the original; and connecting circuits connecting the operating arrangement and the first and second exposure selection devices and being operative to automatically select the two color exposure ratio on the basis of the calibrating values.

21 Claims, 3 Drawing Figures

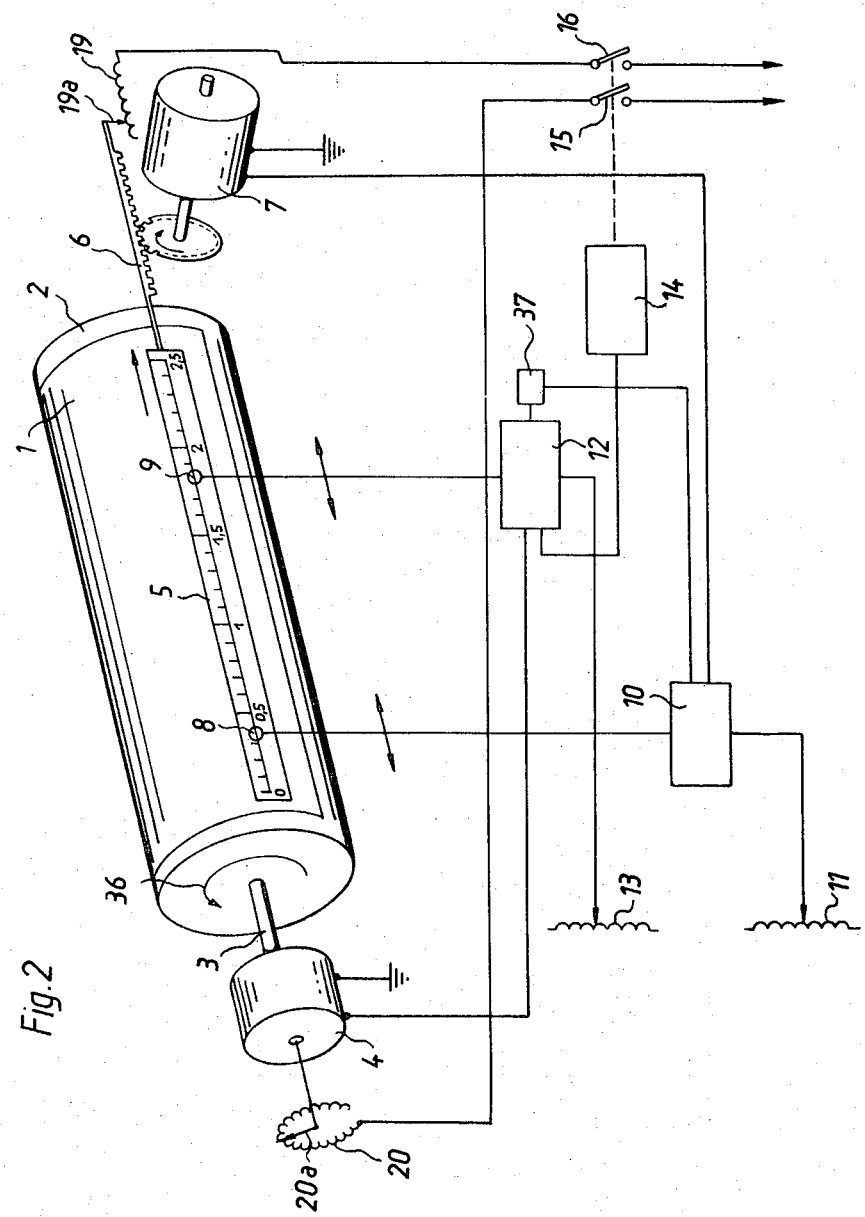

APPARATUS FOR CONTROLLING EXPOSURE

BACKGROUND OF THE INVENTION

The present invention relates to an apparatus for controlling exposure time during the exposure of variable contrast light-sensitive material. In particular, the present invention relates to an apparatus for controlling exposure during the photographic printing of variable contrast photofinshing material which is exposed to light passing through an original in two different colors.

In the graphic arts, particularly in the production of intaglio printing forms by photographic means, the contrast of prints must vary within an accurately determined range. In accordance with presently prevailing practice, a suitable densitometer is applied to the negative to be printed, and the exposure time selected as a function of the maximum or minimum density of such negatives. An operator may utilize an apparatus which features a movable carrier means having a calibration curve which is determined in advance on the basis of the contrast grade of printing material, and a function of the density of the negative or original to be processed. Such an apparatus includes a first adjusting means for selecting the total exposure time to light in both colors (e.g., to blue and yellow light), and second movable adjusting means for selecting the ratio of exposures to light in the two colors within the total exposure time. The ratio may then be selected on the basis of the calibration curve. Such an apparatus is described in U.S. Pat. No. 3,531,199, the entire disclosure of which is incorporated herein by reference.

There are a number of significant disadvantages to the presently known apparatus. The calibration curve (8 of FIG. 2 of U.S. Pat. No. 3,531,199) could be obtained by plotting the values indicating the ratio of individual exposures on a chart indicating the density range of the negative. Another calibration technique is to utilize a calibrating wedge, preferably provided with a small auxiliary scale which is printed onto the material which is exposed to light during calibration. A densitometer is then employed to determine the position of the point corresponding to the desired maximum density on each of the exposed test strips. The calibrating curve then enables the operator to select the ratio of exposure time to the two colors on the basis of a density analysis of the negative or original in such a way that the contrast of prints is standardized within a predetermined range while the developing treatment to which the exposed print or variable contrast material is subjected remains unchanged.

The use of such a calibration curve is essentially a mechanical method to determined the exposure time and color ratio on the basis of the maximum and minimum density values of the original. The realization of this method through presently known apparatus leads to certain difficulties, such as the length of time between making the calibration test with the apparatus, and plotting and determining the calibration curve on the basis of a plurality of different exposures, developing the resulting exposures, and interpreting them in the form of the desired color ratios. In this sequence of operations necessary for calculation of the calibrating curve, not all of the parameters or factors remain constant over time. The concentration and temperature of the exposure bath, the brightness of the light source, and other variables must be constant to obtain uniform results, which makes accuracy over a long period of time significantly difficult to attain.

Furthermore, these methods are often subject to operator error, since a variety of difficult calculations must be made with a slide rule or other calculator.

SUMMARY OF THE INVENTION

It is an object of the invention to provide an automatic and versatile exposure control apparatus which can be used to select the gradation in contrast of a variable-contrast recording medium, in such a way that the medium exhibits a standardized range of contrasts irrespective of variations in density of the original, without resorting to complicated developing procedures.

Another object of the invention is to provide a novel and useful automatic electronic timer device which can be utilized in an exposure control arrangement to select the ration of exposures to light of two different colors on variable-contrast printing papers.

A further object of the invention is to provide an exposure control apparatus utilizing movable photoelectric sensor means in conjunction with a calibration film in order to automatically determine the ratio of exposure times to light of two different colors on the basis of the maximum and minimum opacities of the negative or original, and the desired maximum and minimum opacities or densities of the print or reproduction material.

A further object of the invention is to provide an exposure control apparatus which can be used in combination with enlargers, contact printers, projection printers, and/or other reprographic instruments.

An additional object of the invention is to provide an apparatus which can be used to control exposure of different grades of variable-contrast reprographic or printing material. The improved apparatus comprises electronic timer means having adjusting means for selecting the total exposure time to light in the two desired colors, determined on the basis of the contrast grade of the photosensitive material; operating means for selecting the ratio of exposures to light in the two colors within the total exposure time; first exposure selecting means having calibrating values determined by the desired contrast of the exposed photosensitive material; second exposure selecting means having calibrating values determined on the basis of the minimum and maximum densities of the original; and connecting means connecting the operating means and the first and the second exposure selection means and being operative to automatically select said ratio on the basis of the calibrating values.

The novel operating means comprise two movable photoelectric cells or sensors, slidable on a graduated scale corresponding to and calibrated in the density range of an original, and movable over the surface of an exposed test or calibrating film. The image on the calibrating film is composed of two different colors, in different ratios and densities over the area of the film, based on an exposure by means of a gray wedge for each individual color. The exposed and developed calibrating film is preferably located on the surface of an opaque rotating drum, and a scale is located adjacent to the surface, parallel to the axis of the drum. After initially standardizing the location of the scale, and the location of the drum, the operating means move the scale and the drum simultaneously or, equally as well, sequentially, until the photocells detect a predetermined density value on the surface of the test film.

The connecting means (comprising two comparators) compares the predetermined density values as set on the first and second exposure selecting means with the actual density values on the calibrating film. The calibrating film represents the difficult-to-qualify variables such as concentration of developer, intensity of light, temperature, and other effects. Once a predetermined functional relationship is satisfied (equality of predetermined density values and values measured by the photocell), the comparators stop the motion of the scale and the drum, and a switching circuit is activated to start the electronic timing circuit. The particular position of the photocells on the calibrating film is reflected by two potentiometers connected to the scale and the drum, which are operatively associated with the timing circuit.

The present invention automatically calculates the correct exposure times and ratios of the two colors based on the predetermined density values set at the beginning of the operation.

The calibrating film is produced by exposing a test film to two different colors with the aid of a gray wedge. During the first color exposure the gray wedge is situated in a first fixed direction. During the second shorter exposure to the second color, the gray wedge is situated in a second fixed direction turned through 180° with reference to the first direction.

The calibrating film represents various ranges in lightness or opacity, and hue or color, that can be achieved by the exposure and developing process.

The novel features which are considered as characteristic for the invention are set forth in particular in the appended claims. The invention itself, however, both as to its construction and its method of operation, together with additional objects and advantages thereof, will be best understood from the following description of specific embodiments when read in connection on with the accompanying drawing.

BRIEF DESCRIPTION OF THE DRAWING

FIG. 2 illustrates the arrangement for photoelectrically measuring regions of the test film seen in FIG. 1, combining a perspective view of the apparatus with a block diagram of additional functional elements.

DESCRIPTION OF THE PREFERRED EMBODIMENT

Figure 1:
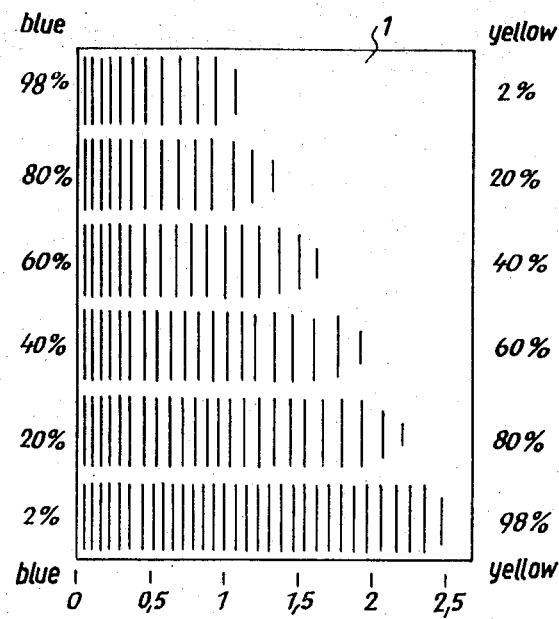
FIG. 1 shows a diagrammatic representation of a two color calibrating or test film.

FIG. 1 shows an essentially square calibrating film or test which is shown divided into six equally spaced horizontal bands solely for the purpose of illustration. The film 1 is made of a material which corresponds in characteristics to the film to be exposed. Each of the illustrated bands continuously varies in tone from left to right, becoming lighter and lighter in gray tone in the righthand direction. The bottom portion of the film 1 shows a range of gradations varying between zero and 2.5, and corresponding to calibrating densities. The gradations in tone represent varying percentages of either blue or yellow exposures; the bottom strip, for example, represents a yellow exposure of 100 percent, and a blue exposure of 0 percent. As one considers the respective superjacent strips, one sees that the percentage of blue exposure increases from zero to 100 percent, and the corresponding yellow exposure decreases from 100 to 0 percent; so that at any point of the film the total amount of yellow and blue exposure equals 100 percent. A fixed time exposure over a predetermined part of the film piece would determine a resulting net density corresponding to the total yellow and blue gradations at that particular point.

Each point of the film 1 corresponds to a different density or tonal gradation (x-axis) and to a corresponding ratio of the two colors blue and yellow under consideration (y-axis). The purpose of the representation is to enable the present invention to automatically select the ratio of exposures to two colors on the basis of a density analysis of the subject originals or negatives in such a way that the contrast of prints is standardized within a predetermined range while the developing treatment to which the variable-contrast material is subjected remains unchanged.

The present invention is able to avoid the influence of possible differences in handling between development of the test film and the variable-contrast production film.

FIG. 2 shows an apparatus employing the test film 1 described in FIG. 1. The film 1 is situated in a specific portion of a transparent drum 2, with a light source (not shown) in the interior of the drum so as to illuminate the film 1 from the inside and project a tonal image onto the outer surface of the drum. The shaft 3 of the drum 2 is rotated in the direction of the arrow 36 by means of a motor 4. In the immediate neighborhood of the drum surface is mounted a scale 5 extending in a direction parallel to the axis of the drum. The scale 5 is connected at one end to a rack and pinion arrangement 6, capable of moving the scale in a direction parallel to the axis of the drum by means of a reversible motor 7. The scale 5 slidably carries two photocells 8 and 9, so disposed so as to be activated by the light source shining through the test film onto the surface of the drum. The photocells are small enough to be able to measure the total gradations that are present at a very small portion of the surface of film 1. The scale 5 also carries density measuring markings from 0 to 2, 5, corresponding to the total density gradations of the test film 1, so that the photocells 8 and 9 can be slidably situated on predetermined corresponding density values on the scale 5 without a great deal of difficulty. For the time being, one can consider the points at which the photocells are situated as corresponding to the minima and maxima densities, respectively, of exposure of the original.

The ouput of the photocell 8 is connected to the input of a first differential amplifier or comparing means 10, the second input of which is connected to the slide or wiper of a potentiometer 11. An output of the comparing means 10 is connected to the reversible motor 7. The output of the photocell 9 is connected to the input of a second differential amplifier or comparing means 12, the second input of which is connected to the wiper of a second potentiometer 13. An output of the comparing means 12 controls the motor 4, and thereby the rotation of the drum 2. The differential amplifier 12 also controls the switch control device 14, which activates the switches 15 and 16, which are connected to motors 4 and 7, respectively, through potentiometers 20 and 19, respectively. The switches 15 and 16 control the electronic timing circuit seen in FIG. 3.

Figure 3:
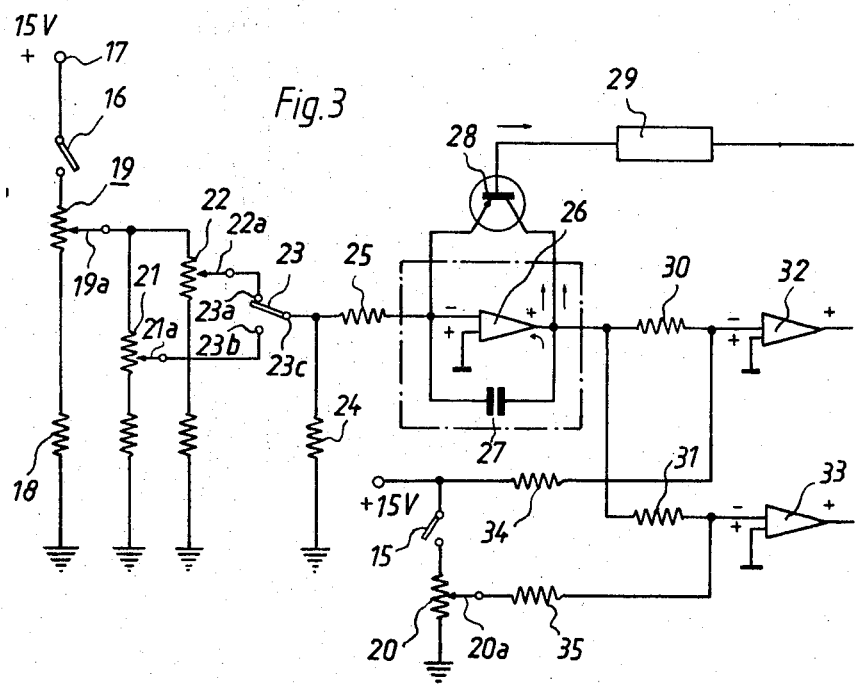
FIG. 3 is a circuit diagram of a timing apparatus for determining the exposure time of the two colors through the arrangement shown in FIG. 2.

FIG. 3 illustrates the circuit diagram for the timing circuit, which corresponds to the one illustrated in FIG. 4 of U.S. Pat. No. 3,531,199, the entire disclosure of which was incorporated herein by reference. FIG. 3 shows a voltage source 17 connected to the switch 16 and, in turn, to a potentiometer 19 with a wiper or sliding contact arm 19a. The potentiometer 19 is connected to another resistor 18 and thereby to ground. The contact arm 19a of the potentiometer 19 is connected with the windings of two additional potentiometers 21 and 22 which constitute a voltage divider and which are connected with ground by means of two resistors. The contact arms 21a, 22a of the potentiometers 21, 22 are connected with the fixed contacts 23a, 23b of a two-way electric switch 23 whose movable central contact 23c is connected with the inputs of an operational amplifier, or Miller integrator, by way of a fixed resistor 25. Another resistor 24 is connected between ground an a juncture between the movable contact 23c and resistor 25.

The operational amplifier of Miller integrator 26 serves to produce a voltage as a function of time, namely, a negative potential which increases from zero potential at the start of exposure. This amplifier circuit further comprises a feedback element or condenser 27. The operational amplifier circuit shown in the dashed and dotted line box including elements 26 and 27, produces a voltage which increases above or decreases below the starting voltage of the feedback element 27 as a function of time. The plates of the feedback element 27 are connected to the emitter-collector circuit of a switching transistor 28 which discharges the feedback element 27 sufficiently in response to a signal from a conventional control unit 29 prior to start of an exposure. When the transistor switch is closed, only the saturation voltage across the emitter-collector circuit remains.

The output of the operational amplifier 26 is connected with two current-comparing or evaluating devices 32, 33 by way of resistors 30, 31, respectively. These devices 32, 33 compare the currents flowing from the operational amplifier 26 with reference currents flowing through the resistors 34, 35. The reference current for the device 32 is obtained from a source of reference voltage (shown as, for example +15 volts) and a resistor 34 as a function of the output signal of the amplifier 26. The reference current for the device 33 is obtained from the potentiometer 20 (which constitutes a voltage divider and determines the operating range of the device 33) and resistor 35 which is connected with the wiper or sliding contact arm 20a of the potentiometer 20.

One end of the winding of the potentiometer 20 is connected through a switch 15 with a source of reference voltage (+15 volts) and the other end of this winding is connected to ground.

The comparing devices 32, 33 determine the exposure time whereby a response from the device 33 produces a changeover from the first color to the second color, and whereby a response from the second device 32 terminates the exposure.

One of the new processes for developing prints or other photosensitive material utilizes a test emulsion or film, such as described above, with different density values and different color proportions such as shown diagrammatically in FIG. 1. This new process aims at achieving uniform print quality, and particularly greater sensitivity to color differences and contrasts. In accordance with this process, negatives are printed with the exposure time selected as a function of the maximum or minimum density of such negatives. The resulting prints are developed by regulation of the duration of processing and the temperature and/or concentration of developing agent in such a way that the developed print exhibits the desired range of densities. The test film 1 is wound around the drum 2 in a position so as to reproduce the desired density patterns, and contrasts, in the test exposure apparatus. The apparatus is set and standardized to operate with an exposure time of about 15 minutes suitable for most material being exposed.

The operation of the apparatus is as follows: it is first assumed that the maximum and minimum capacities of the negative or original are determined with a densitometer well known in the art; these maximum and minimum densities correspond to the darkest and lightest points of the original. The operator then shifts the left photocell 8 along the scale 5 to correspond to the lightest density value of the original. The operator then shifts the right photocell 9 along the scale to the density value corresponding to the greatest point of density of the original. The desired maximum and minimum opacities or densities of the print are also assumed to be known in advance. The operator then sets these maximum and minimum opacities or densities on the potentiometers 11 and 13, respectively. For example, the operator may set the maximum density value to be 1.6 on potentiometer 11, and the minimum density value to be 0.3 on potentiometer 13.

According to the present invention, the photocells 8 and 9 will seek out the desired minimum and maximum copy density on the test film 1, due to the rotation of the surface of the drum 2 in the direction 36 and the movement of the scale 5 in the lateral direction parallel to the axis of the drum. The process begins with the scale 5 originally in the region of the test film 1 where there are the greatest intervals between lines of equal densities. The photocell 8, together with the comparison amplifier 10, will be the first to operate. The photocell will measure the density on the test film, which at the starting point corresponds to the density value set by the position of the photocell 8 on the scale 5. This density value will then be compared with the value set on the potentiometer 11. The operational amplifier 10 will then activate the motor 7 to shift the position of the scale 5, and correspondingly the position of the photocell 8, along the horizontal direction of the test film until the density sensed by the photocell 8 corresponds with the predetermined set density on the potentiometer 11. The photocell 8 will then be located on the beginning of the desired equidensity line of the test film. Next the photocell 9, in conjunction with the differential amplifier 12, operates to rotate the drum 2 through the motor 4. The rotation of the drum corresponds to seeking the desired density value for the photocell 9 on the film strip 1 corresponding to the predetermined density value as set on the potentiometer 13. Since the photocell 18 has already been set on the desired minimum density value, the motion of the scale will follow the line of equidensity along the vertical direction of the film strip, by means of simultaneous operation of the motors 7 and 4. The photocell 9 will seek out the desired maximum density value along the vertical direction of the test film 1, while the scale moves in such a manner that the photocell 8 remains on the same desired equidensity line. Since the equidensity lines are not parallel but converge at some point the desired maximum density value will be reached by the photocell 9, and the motors 4 and 7 will stop. At this particular point, the wipers or contact arms 19a and 20a of potentiometers 19 and 20, respectively, will correspond to the indicated position of the photocells on the surface of the film strip 1. The switching unit 14 will be activated and serve to close the switches 15 and 16, thereby transmitting the information contained in the positions of potentiometers 19a, 20a to the electric timing circuit as seen in FIG. 3.

When the two inputs of the differential amplifier 10 correspond, the switch 37 is closed to activate the amplifier 12, which in turn activates the photocell 9 and the motor 4 to turn the drum 2. With sufficiently fast operation of the sequence of devices 8, 10 and 7, both amplifiers can be switched on and operated almost simulateously.

The exposure step begins following the closing of the circuit of the transistors 28, through switches 15, 16, activated by the switching unit 14. The first exposure step, for example, utilizing a blue filter in the printing or enlarging machine, is controlled by various settings. Potentiometer 22 and sliding arm 22a are set depending on the blue sensitivity of the film to be printed. The position of the sliding arm 19a on the potentiometer 19 determines effectively the length of time of exposure. The exposure to the other color (yellow) can begin immediately following withdrawal of the blue filter from the apparatus. The exposure time to the yellow filtered light source is again controlled by potentiometer settings in the apparatus, specifically the yellow sensitivity setting of potentiometer 21 by means of sliding arm 21a, and the density setting corresponding to potentiometer setting 20a of potentiometer 20.

In order to enable the printer to utilize different types of printing paper (e.g., for print toning or multi-screen technique), the potentiometers 11 and 13 may be set for the desired density values on the copy or print, and the sensitivity values set on potentiometers 22 and 21.

For the exposure of additional originals one need only set the corresponding photocells 8 and 9 to the predetermined density ranges of the new originals, and activate the motor 4.

It will be understood that each of the elements described above, or two or more together, may also find a useful application in other types of exposure control apparatus, differing from the types described above.

While the invention has been illustrated and described as embodied in an apparatus for controlling exposure of variable contrast photosensitive material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an apparatus for controlling the exposure of variable-contrast photo-sensitive material which is exposed to light passing through an original in two colors, and whose gradation is different for each of said colors, a combination comprising electronic timer means having adjusting means for selecting the total exposure time to light in said colors, determined on the basis of the contrast grade of said photo-sensitive material; operating means for selecting the ratio of exposures to light in said colors within said total exposure time; first exposure selecting means having calibrating values determined by the desired contrast of the photo-sensitive material; second exposure selecting means having calibrating values determined on the basis of the minimum and maximum densities of said original, and connecting means connecting said operating means and said first and second exposure selection means and being operative to automatically select said ratio on the basis of said calibrating values.

2. A combination as defined in claim 1, wherein said first exposure selecting means comprise a potentiometer.

3. A combination as defined in claim 1, wherein said sevond exposure selecting means comprise a movable scale marked with density calibrating values, and first and second photoelectric cells slidably mounted on said scale.

4. A combination as defined in claim 3, wherein said photoelectric cells are positioned at calibrating values on said scale corresponding to minimum and maximum densities of said original.

5. A combination as defined in claim 1, wherein said adjusting means of said timer means comprises a potentiometer.

6. A combination as defined in claim 4, wherein said operating means comprises a calibrating film representing different lightness and hue of said variable-contrast material.

7. A combination as defined in claim 6, further comprising a light source, and wherein said calibrating film is interposed between said light source and said photoelectric cells so that said cells detect the light transmitted through said film.

8. A combination as defined in claim 7, wherein said film is mounted circumferentially on a rotatable drum, and said scale is situated at the surface of said drum parallel to its axis.

9. A combination as defined in claim 8, wherein said scale is moveable by a first motor in a direction parallel to the axis of the drum.

10. A combination as defined in claim 7, further comprising a first potentiometer having a wiper arm; and wherein said scale is connected to the wiper arm of said first potentiometer so as to register the lateral displacement of said scale.

11. A combination as defined in claim 10, further comprising a second potentiometer having a wiper arm; and wherein a shaft of said drum is connected to said wiper arm of said second potentiometer so as to register the angular displacement of said drum.

12. A combination as defined in claim 6, wherein said calibrating film comprises the developed image of a gray wedge with different color ratios.

13. A combination as defined in claim 12, wherein said colors are sequentially exposed and superimposed.

14. A combination as defined in claim 9, wherein said first motor is connected to an output of first comparing means, and a first input of said first comparing means is connected to said first photocell.

15. A combination as defined in claim 8, wherein said drum is rotatable by a second motor.

16. A combination as defined in claim 15, wherein said second motor is connected to an output of second comparing means, and a first input of said second comparing means is connected to said second photocell.

17. A combination as defined in claim 14, wherein said first exposure selecting means comprises first and second potentiometers, and said first potentiometer is connected with said second input of said first comparing means.

18. A combination as defined in claim 16, wherein said first exposure selecting means comprises first and second potentiometers, and said second potentiometer is connected with said second input of said second comparing means.

19. A combination as defined in claim 1, wherein said connecting means comprise first and second comparing means which compare said calibrating values of said second exposure selecting means with said calibrating values of said first exposure selecting means to activate switching means when said calibrating values satisfy a predetermined functional relationship.

20. A combination as defined in claim 19, wherein said switching means activates said timer means.

21. A combination as defined in claim 19, wherein said second exposure selecting means comprises a photoelectric cell, and said calibrating values of said second exposure selecting means are determined by said cell.

* * * * *